Nov. 7, 1944.  L. DE FLOREZ  2,361,929
AIRPLANE VISUALIZING DEVICE
Filed Sept. 2, 1942   2 Sheets-Sheet 1

INVENTOR
LUIS DE FLOREZ
BY
ATTORNEY

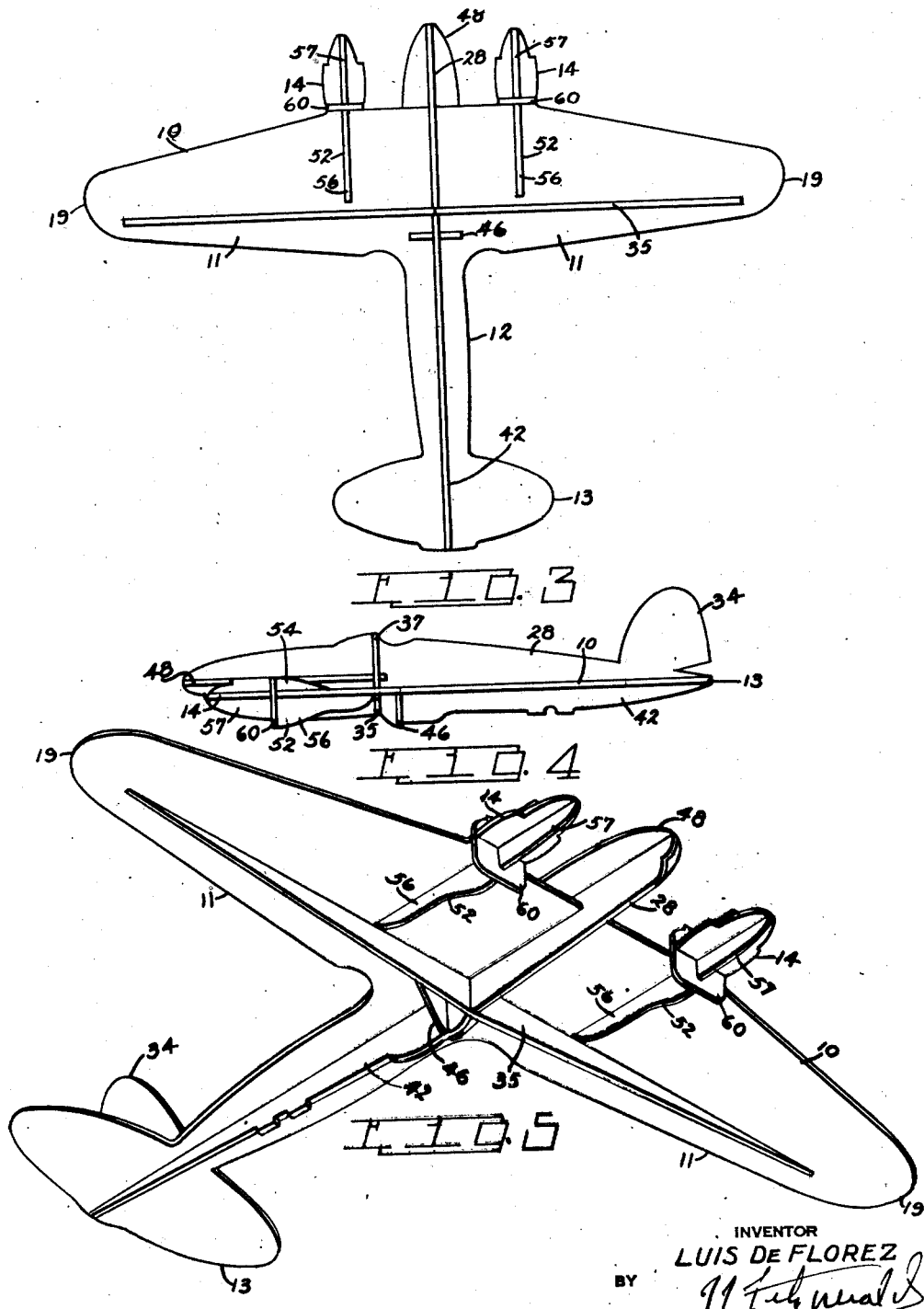

Patented Nov. 7, 1944

2,361,929

UNITED STATES PATENT OFFICE 2,361,929

AIRPLANE VISUALIZING DEVICE

Luis de Florez, United States Navy

Application September 2, 1942, Serial No. 457,038

2 Claims. (Cl. 35—1)

(Granted under the act of March 3, 1883, as amended April 30, 1928; 370 O. G. 757)

The present invention relates to an airplane visualizing device.

At the present time, airplane observers or spotters are usually provided with silhouettes of various types of airplanes for comparison with airplanes in flight for the purposes of identification. These silhouettes usually follow the outlines of top plan, front and side elevation drawings. Since the observer is, in many cases, called upon to identify airplanes that appear only in perspective, the use of silhouettes alone is not always entirely satisfactory. It is, therefore, an important object of the present invention to provide a device for readily visualizing an airplane at any angle of perspective, and a device that may be economically produced when the profiles of the airplane are known.

Also miniature drawings of proposed new models are made, and from these drawings molded or cast models are made, for the purpose of studying the lines of the proposed aircraft. This procedure takes time and it is very costly.

Accordingly, the present invention has for its general object the provision of a device which may be defined as a three-dimensional silhouette model, i. e., a device by means of which the silhouette of an aircraft may be viewed from any angle, without the necessity of providing a solid three-dimensional model. More specific objects are the provision of such a device by stamping, die-cutting or otherwise working a flat sheet of suitable material, to form separable pieces of suitable outline, and provided with the necessary slots, tabs and cut-outs whereby the several pieces may be assembled in interlocking relation to make up the device in question.

Other objects and advantages of the invention will become apparent during the course of the following detailed description, when taken in connection with the accompanying drawings, forming a part of this specification and in whch drawings;

Figure 3 is a bottom plan view of Figure 2.

Figure 4 is a side elevational view of the assembled device.

Figure 5 is a perspective view of the underneath side of my novel device.

Figure 1:
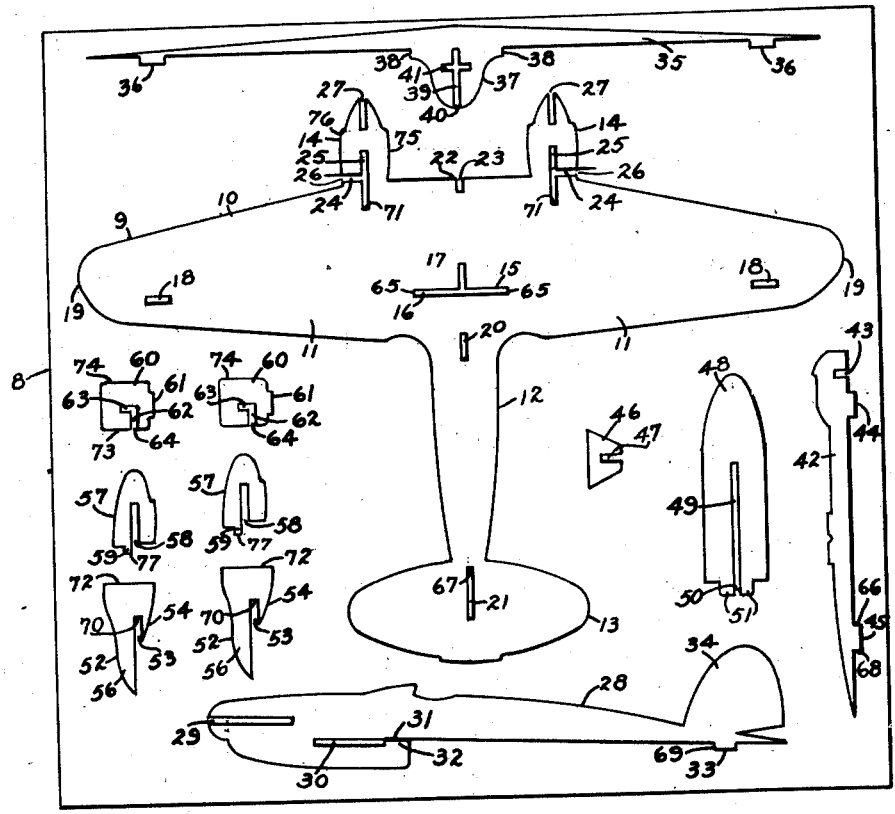
Figure 1 is a plan view of a sheet on which are scored or die stamped various members, the members when removed and assembled form my novel aircraft silhouette visualizing device.

Referring to the drawings, the numeral 8 represents a sheet of thick, heavy material. The numeral 9 represents the line that forms the outline portion of an airplane, the lines being stamped, die cut or otherwise weakened in the sheet 8. The numeral 10 represents in plan an airplane having wings 11, a fuselage 12, a tail 13 of substantially ellipsoidal configuration and projections 14 that simulate motors. Midway the ends of the wings 11, is an aperture 15 having slots 16 and 17, the slot 16 being in line with apertures 18 that are adjacent the wing tips 19. In the fuselage 12 is provided an aperture 20, and in the tail 13 is an aperture 21. Centrally disposed in the leading edge of the wing at 22 is a notch 23. The projections 14 are provided with slots 24 and 25 that form a T shaped configuration, the slot 24 having an open mouth 26. The projections 14 are each further provided with a slot 27, and these slots and those previously mentioned, together with apertures and notches in other members to be described, all being provided for a purpose to be later set forth.

The parts to be assembled to the member 10, comprise, a member 28 having slots 29 and 30, an elongated slot 31, studs 32 and 33, and a portion 34 of semi-ellipsoidal configuration, that forms the rudder. A bridge member 35 is provided, and it has studs 36 adjaceint its ends, and a central upstanding portion 37 having shoulders 38. The portion 37 of the bridge member 35 is provided with a slot 39 having an open mouth 40 and a cross slot 41 that is in communication with the slot 39. A strip member 42 is provided and it has a notch 43 and studs 44 and 45. A trapezoidal member 46 is provided and it has a slot 47, the slot having an open mouth. There is also provided an elongated member 48 of bullet configuration which has a slot 49, an open mouth 50 and tabs 51; a pair of members 52 having slots 53 and one side 54 shorter than the other side 56; a pair of members 57 having slots 58 and studs 59; and finally, a pair of members 60, each of these members having a reduced head portion 61 and slots 62, and 63, the slot 62 having an open mouth 64.

Having enumerated the various members of my novel device, the members are assembled in the following order; however, I wish to have it understood that I do not confine myself to the order of assembly as enumerated. The members are first removed from the sheet 8, illustrated in Figure 1, by exerting slight pressure on the members, ready removal of the members being possible due to the outline of the members having been cut entirely through the sheet 8. After the members have been removed, the member 28 is positioned in place on the member 10 by sliding the member 28 toward the tail 13, the elongated slot 31 permitting the member 28 to pass rearwardly until the front end wall of the slot 30 engages the notch 23, the stud 32 engaging the slot 17 of the aperture 15, thus locking the member 28 in position.

Figures 2, 6:
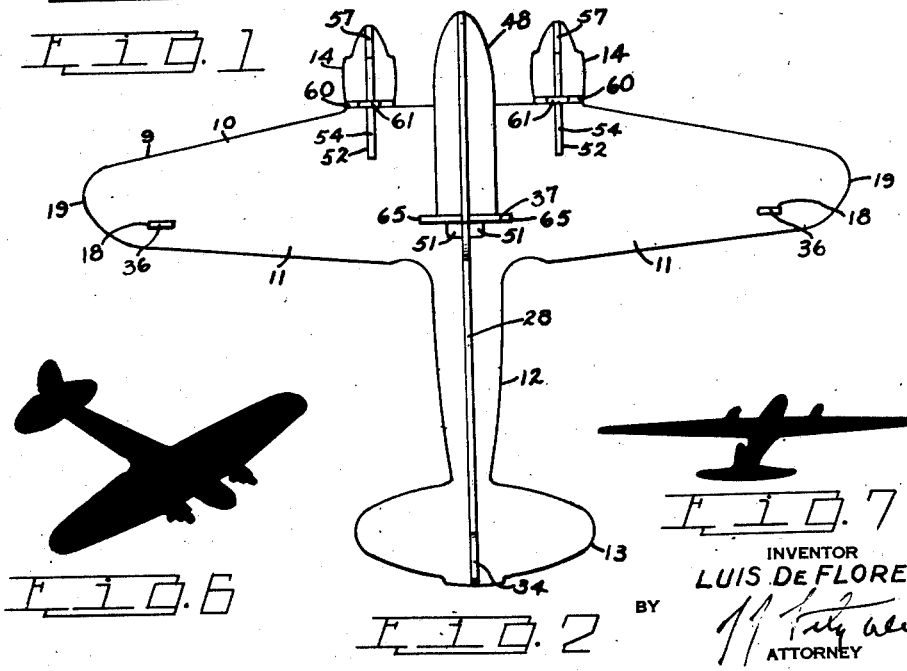
Figure 2 is a top plan view of the members assembled.
Figure 6 is a perspective view in silhouette looking down on the device.
Figure 7:
Figure 7 is a perspective view in silhouette looking at the device from underneath.

The bridge member 35 is next positioned on the under side of the member 10, the portion 37 being inserted into the slot 16 of aperture 15 until the walls of the shoulders 38 engage the end walls 65 of the slot 16, the studs 36 engaging the apertures 18 and locking the bridge member in place. The member 48 is next placed in position, the open mouth 50 and slot 49 engaging the slot 29, the member 48 being pushed rearwardly until the studs 51 engage the slot 41 in the portion 37 of the bridge member 35, the studs as shown in Figure 2 of the drawings extending rearwardly of the rear face of the portion 37. The member 46 is next in the assembly and it is fitted to the member 42, the slot 47 engaging the notch 43, this assembly is then positioned on the under side of the member 10, the stud 44 engaging the aperture 20 and the stud 45 the front portion of the aperture 21 the end wall 66 of the stud 45 impinging the wall 67 of the aperture 21, and at the same time the end wall 68 of the stud 45 impinges the end wall 69 of the stud 33 of member 28. The interlocking of studs 33 and 45 provides a rigid locking means for the rear portions of members 28 and 42. The members that make up the motors being identical, only one motor assembly will be described. The portion 54 of the member 52 is passed through the slot 25 from the under side of the member 10, until the slot 53 is in line with the slot 25, the portion 56 of member 52 being of greater length than portion 54. The member 52 is then pushed rearwardly until the end wall 70 of the member 52 impinges against the end wall 71 of the slot 25, the side end 72 of the member 52 being uniplanar with the leading edge of the member 10. The member 60 is the next to be placed in position, the mouth 64 of the slot 62 engages the mouth 26 of slot 24 and this member is pushed inwardly until the end walls 73 and 74 are uniplanar with the side walls 75 and 76 of the portion 14 of member 10. The member 57 is next to be fitted into position, the slot 58 engaging the slot 27 in line, the member 57 is then pushed rearwardly and during this movement the stud 59 engages the slot 63, the end wall 77 impinging the face of the side end wall 72 of the member 57 and locking the member 57 to the portion 14 of the member 10.

My novel aircraft visualizing device is now complete, and in its assembled position it is to be noted that the sheet material is disposed at three different angles, namely, in planes parallel to the longitudinal, transverse and horizontal planes of the device, and due to this arrangement of the members the device when viewed from any angle will simulate an actual airplane in outline. The device when oriented, so that its three axes are disposed in parallel relation to the corresponding axes of an actual plane in flight will produce a visual image of the plane in flight for the purpose of identification or comparison.

The invention described herein may be manufactured and used by or for the Government of the United States of America for governmental purposes without the payment of any royalties thereon or therefor.

What is claimed is:

1. An airplane visualizing device formed of flat sheet members and comprising horizontal members of irregular shape similar to the irregular outline of a top plan view of an airplane, vertical transverse members of irregular shape similar to the irregular outline of a front elevational view of said airplane, and vertical longitudinal members of irregular shape similar to the irregular outline of a side elevational view of said airplane, whereby said members when assembled simulate the appearance of an airplane corresponding to said view when observed from an angle for purposes of identification and comparison.

2. An airplane visualizing device formed of flat sheet members and comprising horizontal members irregularly shaped to conform to the top plan view of an airplane, vertical transverse members irregularly shaped to conform with the front elevational view of said airplane, vertical longitudinal members irregularly shaped to conform with the side elevational view of said airplane, said members being disposed in planes at right angles to one another whereby said device when oriented to a position wherein said longitudinal, vertical and horizontal members are disposed in planes parallel to the horizontal, vertical and longitudinal axes of said airplane in any position of flight will simulate the appearance of said airplane.

LUIS DE FLOREZ.